United States Patent [15] 3,685,886
Nakajima et al. [45] Aug. 22, 1972

[54] FILTER FOR IMAGE PICKUP IN SURFACE-SEQUENTIAL COLOR TELEVISION

[72] Inventors: Toshihiko Nakajima, Tokyo; Yasufumi Yumde, Iruma-gun, both of Japan

[73] Assignee: Hitachi, Ltd., Tokyo, Japan

[22] Filed: Oct. 6, 1970

[21] Appl. No.: 78,371

[30] Foreign Application Priority Data

Oct. 7, 1969 Japan ....................44/79604

[52] U.S. Cl...............350/315, 178/5.4 CF, 350/317
[51] Int. Cl...........................................G02b 5/22
[58] Field of Search...350/311, 315, 317; 178/5.4 CF

[56] References Cited

UNITED STATES PATENTS

| | | | |
|---|---|---|---|
| 2,912,497 | 11/1959 | Parrott | 178/7.6 X |
| 2,762,860 | 9/1956 | Jackson | 178/5.4 CF |
| 2,466,021 | 4/1949 | Goldmark | 178/5.4 CF |
| 3,515,800 | 6/1970 | Ebihara et al | 350/315 X |

*Primary Examiner*—David Schonberg
*Assistant Examiner*—Toby H. Kusmer
*Attorney*—Craig, Antonelli & Hill

[57] ABSTRACT

A filter for image pickup in surface-sequential color television, comprising a rotary disc consisting of a tricolor filter for red, green and blue, boundary lines for division of said three-color filter being in such a spiral form that the tangential line of said each boundary line and the scanning line of an image pickup tube are coincident.

3 Claims, 3 Drawing Figures

INVENTORS

TOSHIHIKO NAKAJIMA AND
YASUFUMI YUMOE

BY Craig, Antonelli, Stewart & Hill

ATTORNEYS

FILTER FOR IMAGE PICKUP IN SURFACE-SEQUENTIAL COLOR TELEVISION

BACKGROUND OF THE INVENTION

1. Field of the Invention

This invention relates to a filter for image pickup in color television, and more particularly to a rotary-disc three-color-divided filter for image pickup in a surface-sequential color television camera.

2. Description of the Prior Art

In prior art rotary-disc filters for a surface-sequential color television camera, the shape of three-color domains has been often determined by experiment. They have therefore had such disadvantages that the disc is large in diameter and that they are subject to frequent color mixing.

Conditions generally required for a filter for image pickup in the surface-sequential color television, are:

a. Capability of changing-over spectroscopic filter portions for the three colors of red, blue and green in synchronism with the field frequency.

b. Free from color mixture in order to reproduce colors of fidelity.

c. Good in the utilization factor of light in order to enhance sensitivity.

d. Small in diameter in order to make the external shape of the camera small.

To meet (a) to (c) among these requirements, a tricolor filter being identical in size to the picture screen of an image pickup tube is sequentially moved just in front of the image pickup tube in synchronism with the field frequency, so that electron-beam scanning may be always carried out at the boundary between the respectively adjacent filter portions. In this case, exposure by each filter portion is performed for just one field, and exposure by the next filter domain starts directly after completion of the former reading scanning. Therefore, no color mixture occurs. In addition, the image pickup tube screen is subjected to exposure at any time by any one of the filter portions, so that the utilization factor of light reaches a maximum.

A rotary filter exhibiting such an ideal function, however, has not yet been realized. As to the configuration of each color filter domain, there has been no other method than the experimental determination as referred to above.

SUMMARY OF THE INVENTION

An object of the present invention is to provide a filter for image pickup in surface-sequential color television, which is free from color mixing and is high in the utilization factor of light.

Another object of this invention is to provide a filter for image pickup in surface-sequential color television, which permits theoretical design.

In order to accomplish the above objects, the invention comprises a rotary disc including a plurality of color filter portions, demarcation lines for division of the respective filter portions being in such spiral form that the tangents thereof are coincident with the scanning lines.

DESCRIPTION OF THE PREFERRED EMBODIMENTS

Figure 1:
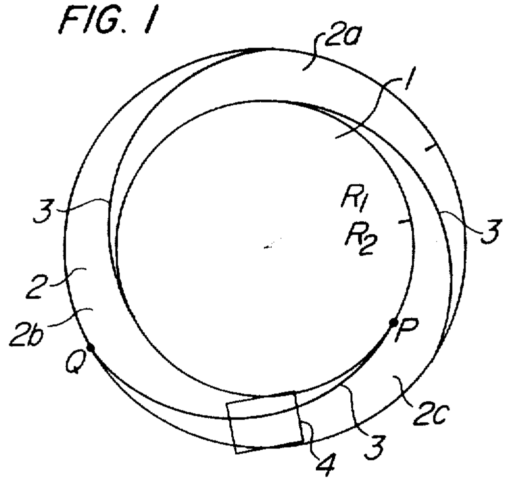
FIG. 1 is a view showing an embodiment of this invention.

Referring to FIG. 1, a disc 1 having a radius of $R_2$ is provided on the outer periphery with a doughnut-shaped filter zone 2. The radius of the disc with the filter zone 2 fitted is set at $R_1$. The disc 1 is not always required, but the filter zone 2 may be also used as the same purpose. The filter zone 2 is divided by three demarcation lines 3, whereby filter domains of red, blue and green 2*a*, 2*b* and 2*c*, respectively, are defined. More specifically, in order that the boundary lines 3 of the respective filter domains 2*a*, 2*b* and 2*c* may move at a uniform velocity on a picture screen 4 of an image pickup tube with rotation of the filter disc, they are drawn in a spiral form represented by the following equation:

$$r = a\theta + R_2 \qquad (1)$$

Thus, the reading scanning of the image pickup tube is carried out on such boundary lines 3. Subsequent to passage of one demarcation line 3, the filter portion of the next color enters the picture screen 4. Equation (1) is given in polar coordinates, where $r$ is the length of a straight line connecting the origin of the polar coordinates and a point on the spiral, $\theta$ is an angle defined between the straight line and the axis of the coordinates, and $a$ is a constant.

Figures 2, 3:
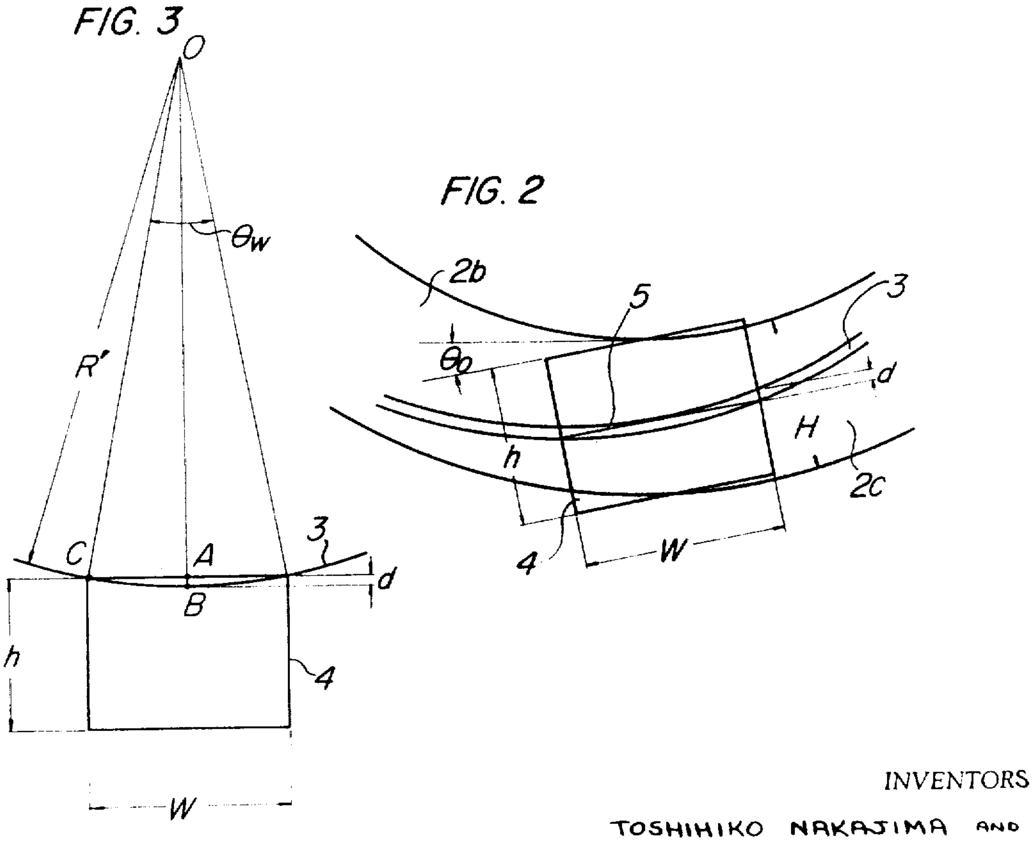
FIG. 2 is an enlarged view of a part of the embodiment shown in FIG. 1, for explaining this invention.
FIG. 3 is a view for explaining another embodiment of this invention.

To synchronize movement of the reading scanning line and that of the boundary line 3, the latter line may move from top to bottom on the picture screen 4, i.e., by a distance along the axis of the disc as shown by H in FIG. 2 while the filter disc is rotated by $1/3n$ revolutions (where $n$ represents the number of sets each consisting of the filter domains of red, blue and green). Therefore, when calculating the constant $a$ on the basis of this condition and with the angle $\theta$ in Eq. (1) represented in radian, we obtain $$a = 3nH/2\pi \qquad (2)$$

On the other hand, since the picture screen 4 inclines by $\theta_0$ with respect to the tangential line of the disc 1, the moving distance H of the spiral may be represented by the following equation:

$$H = h \cos \theta_0 \qquad (3)$$

where $h$ is the height of the picture screen 4.

Accordingly, Eq. (2) becomes $$a = (3nh \cos\theta_0)/2\pi \qquad (4)$$

Since $\theta_0$ is, as described, the inclination of the picture screen or the angle defined between the tangent of the disc 1 and that of the spiral, the following equation holds:

$$\tan \theta_0 = \frac{\frac{dr}{d\theta}}{r} = \frac{3nh \cos\theta_0}{2\pi r} \qquad (5)$$

Transforming Eq. (5), $$3nh \sin^2\theta_0 + 2\pi r \sin\theta_0 - 3nh = 0 \qquad (6)$$

Solving Eq. (6) and taking the positive root only, we have $$\sin\theta_0=\frac{-\pi r+\sqrt{(\pi r)^2+(3nh)^2}}{3nh} \qquad (7)$$

In Eq. (7), $r$ varies within the range of $R_2 \leq r \leq R_1$ and may be approximated by $r=(R_1+R_2)/2$ The radius $R_1$ of the filter is given by $$R_1=R_2+h\cos\theta_0 \qquad (8)$$

and $h$ is determined by the dimensions of the picture screen of the image pickup tube. Hence, if the outward radius $R_1$ of the filter disc is decided from Eqs. (1), (4) and (7), the form of the spiral may be determined.

The spiral thus decided has such a form that the tangential line thereof and the scanning line are substantially coincident. The spiral moved by rotation of the filter disc and the scanning line are therefore brought in operation into synchronism to read signals, whereby an image pickup device free from color mixture and high in the utilization factor of light may be obtained.

In this filter disc, the boundary line 3 of the filter is a curve, whereas the scanning line 5 (see FIG. 2) is a straight line. Accordingly, there is the possibility of color mixing due to an error therebetween. In order to eliminate the disadvantage, the demarcation line 3 is made a black band of a certain width (in general, made a light-impermeable region) as shown in FIG. 2, so that the entire scanning line 5 may lie within the region. However, the band-like region should be as narrow as possible, since it lowers the utilization factor of light when too wide.

This will be further described with reference to FIG. 3. Assuming in the figure that 0 is the center of curvature of the spiral in the vicinity of the picture screen 4 while R′ is the radius of curvature, that width $d$ of the black band of the demarcation line 3 which is required to include the scanning line 5 in the band, is represented by:

$$d=\overline{OB}-\overline{OA}=R'-R'\cos\frac{\theta_W}{2}$$

$$=R'(1-\sqrt{1-\sin\frac{\theta_w}{2}}=R'(1-\sqrt{1-\frac{\overline{AC}}{\overline{OC}}}$$

$$=R'\left(-\sqrt{1=\frac{W}{2R'}}\right) \qquad (9)$$

On the other hand, the radius of curvature R′ of the spiral in Eq. (1), is given by:

$$R'=a\sqrt{1+\theta^2}$$

$$=\frac{3nH}{2\pi}\sqrt{1+\left(\theta+\frac{2\pi R_2}{3nH}\right)^2} \qquad (10)$$

Therefore, the optimum width $d$ of the band in various positions on the spiral may be decided from Eqs. (9) and (10). However, the radius of curvature R may be approximated by $R_2$ in calculation.

As is clear from the above description, the decision of the external shapes of the picture screen of the image pickup tube as well as the filter disc makes it possible to find both the form and width of the spiral of the filter boundaries 3 and the angle at which the picture screen 4 is inclined. Thus, a desired rotary-disc filter may be designed.

In case where the diameter of the filter disc is relatively large, the spiral of each boundary line 3 may be approximated by an arc of a circle. For example, at $n=1$, the radius is one obtained by substituting ⅓π into $\theta$ in Eq. (10), while the center is set at a point equidistant from P and Q in FIG. 1.

As described above, according to this invention, a tricolor filter being identical in size to the picture screen 4 of an image pickup tube is sequentially moved just in front of the screen 4 in synchronism with the field frequency. In addition, electron-beam scanning is always performed within the boundary 3 of each filter domain. Therewith, immediately after exposure by each filter portion is carried out for one field and thus the reading scanning is completed, exposure by the next filter domain is started. As a consequence, there is no fear of color mixing. Furthermore, the image pickup tube screen is always subjected to exposure by any one of the filter domains, with the result that the utilization factor of light reaches a maximum. It is also possible to make the diameter of the filter disc relatively small and to reduce the size of a color television. Thus, the invention has large industrial advantages in industry.

We claim:

1. A filter for image pickup in surface-sequential color television, comprising a rotary disc having a plurality of color filter portions which are divided by spiral boundary lines in such a form as represented by the following equation:

$$r=a\theta+R_2$$

where $r$ is the length of a straight line connecting the origin of polar coordinates to a point on said spiral line,
$\theta$ is an angle defined between said straight line and the axis of the coordinates,
$a$ is constant, and
$R_2$ is the inner radius of the color filter, said disc being rotatable in synchronism with the scanning of the image pickup tube to accord the tangential line of said boundary line with said scanning line on an image pickup tube screen.

2. A filter according to claim 1, wherein said each spiral boundary line comprises a band-like light-impermeable region having a predetermined width.

3. A filter for image pickup in surface-sequential color television, comprising a filter disc of a radius of $r_1$ consisting of a disc of a radius of $R_2$ and a plurality of color filter portions which are provided on the outer periphery of said disc and which are divided by spiral boundary lines in such form as represented by the following equations:

$$\begin{cases} r=a\theta+R_2 \\ a=\dfrac{3nh\cos\theta_0}{2\pi} \\ \sin\theta_0=\dfrac{-\pi r+\sqrt{(\pi r)^2+(3nh)^2}}{3nh} \end{cases}$$

where $r$ is the length of a straight line connecting between the origin of polar coordinates and a point on said spiral, $\theta$ is an angle defined between said straight line and the axis of the coordinates, $n$ is a positive integer, and $h$ is the height of a picture screen of an image pickup tube.

* * * * *